(12) United States Patent
Zhang et al.

(10) Patent No.: US 8,265,354 B2
(45) Date of Patent: Sep. 11, 2012

(54) FEATURE-BASED COMPOSING FOR 3D MR ANGIOGRAPHY IMAGES

(75) Inventors: Li Zhang, Skillman, NJ (US); Michal Sofka, Troy, NY (US); Ulf Schäfer, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 837 days.

(21) Appl. No.: 11/185,603

(22) Filed: Jul. 20, 2005

(65) Prior Publication Data

US 2006/0052686 A1    Mar. 9, 2006

Related U.S. Application Data

(60) Provisional application No. 60/604,133, filed on Aug. 24, 2004.

(51) Int. Cl.
*G06K 9/00* (2006.01)
(52) U.S. Cl. ...................................... 382/128
(58) Field of Classification Search .................. 382/130, 382/131, 294, 298, 299, 266, 103, 173, 174, 382/190, 199, 201, 203, 205, 218, 219, 220, 382/256, 257, 258, 259, 278, 282, 283, 284
See application file for complete search history.

(56) References Cited

U.S. PATENT DOCUMENTS

| | | | | |
|---|---|---|---|---|
| 4,776,023 A | * | 10/1988 | Hamada et al. | 382/147 |
| 4,864,629 A | * | 9/1989 | Deering | 382/216 |
| 4,937,526 A | * | 6/1990 | Ehman et al. | 324/309 |
| 4,989,142 A | * | 1/1991 | Crawford | 382/131 |
| 5,077,805 A | * | 12/1991 | Tan | 382/137 |
| 5,261,010 A | * | 11/1993 | Lo et al. | 382/216 |
| 5,488,674 A | * | 1/1996 | Burt et al. | 382/284 |
| 5,531,227 A | * | 7/1996 | Schneider | 600/425 |
| 5,594,469 A | * | 1/1997 | Freeman et al. | 345/158 |
| 5,633,951 A | * | 5/1997 | Moshfeghi | 382/154 |
| 5,690,106 A | * | 11/1997 | Bani-Hashemi et al. | 600/425 |
| 5,852,669 A | * | 12/1998 | Eleftheriadis et al. | 382/118 |
| 5,924,987 A | * | 7/1999 | Meaney et al. | 600/420 |
| 5,928,148 A | * | 7/1999 | Wang et al. | 600/420 |
| 5,937,083 A | * | 8/1999 | Ostuni | 382/131 |
| 5,956,418 A | * | 9/1999 | Aiger et al. | 382/154 |
| 5,974,165 A | * | 10/1999 | Giger et al. | 382/132 |
| 5,978,443 A | * | 11/1999 | Patel | 378/62 |
| 5,982,915 A | * | 11/1999 | Doi et al. | 382/130 |

(Continued)

OTHER PUBLICATIONS

Hajnal, Hill, Hawkes, Medical Image Registration, 2001, CRC Press,13-17, 26, 40-45, 52-55, 62-63, 72-73, 77-85.*

(Continued)

*Primary Examiner* — Vikkram Bali
(74) *Attorney, Agent, or Firm* — Donald B. Paschburg

(57) ABSTRACT

Multiple volumes that are to be aligned to form a single volume are processed. The system and method use an equalization step, a edge detection step and a correlation step to determine the overlapping positions between the first volume and the second volume of a volume pair having a maximum correlation value, and the best alignment of the first volume and the second volume of the volume pair is determined by the correlation value. A coarse correlation step using lower resolution volumes can be performed first followed by a fine correlation step using higher resolution images to save processing time. Initial preprocessing steps such as volume shearing can be performed. Equalization involves equalizing voxel size and edge detection can be performed using a Canny edge detector.

20 Claims, 5 Drawing Sheets

U.S. PATENT DOCUMENTS

| | | | | |
|---|---|---|---|---|
| 6,009,190 | A * | 12/1999 | Szeliski et al. | 382/154 |
| 6,073,042 | A * | 6/2000 | Simonetti | 600/420 |
| 6,076,004 | A * | 6/2000 | Kanayama et al. | 600/410 |
| 6,097,833 | A * | 8/2000 | Lobregt et al. | 382/130 |
| 6,137,910 | A * | 10/2000 | Shinagawa et al. | 382/195 |
| 6,151,424 | A * | 11/2000 | Hsu | 382/294 |
| 6,167,167 | A * | 12/2000 | Matsugu et al. | 382/283 |
| 6,229,909 | B1 * | 5/2001 | Tohyama | 382/124 |
| 6,268,730 | B1 * | 7/2001 | Du | 324/309 |
| 6,311,085 | B1 * | 10/2001 | Meaney et al. | 600/420 |
| 6,351,573 | B1 * | 2/2002 | Schneider | 382/294 |
| 6,363,163 | B1 * | 3/2002 | Xu et al. | 382/130 |
| 6,404,920 | B1 * | 6/2002 | Hsu | 382/190 |
| 6,477,272 | B1 * | 11/2002 | Krumm et al. | 382/170 |
| 6,587,598 | B1 * | 7/2003 | Devillers et al. | 382/284 |
| 6,594,378 | B1 * | 7/2003 | Li et al. | 382/128 |
| 6,687,528 | B2 * | 2/2004 | Gupta et al. | 600/410 |
| 6,704,440 | B1 * | 3/2004 | Kump | 382/132 |
| 6,738,063 | B2 * | 5/2004 | Shen et al. | 345/424 |
| 6,842,638 | B1 * | 1/2005 | Suri et al. | 600/425 |
| 6,901,282 | B2 * | 5/2005 | Edelman | 600/420 |
| 6,904,163 | B1 * | 6/2005 | Fujimura et al. | 382/131 |
| 6,963,768 | B2 * | 11/2005 | Ho et al. | 600/415 |
| 6,980,845 | B1 * | 12/2005 | Alsop | 600/410 |
| 7,003,143 | B1 * | 2/2006 | Hewitt et al. | 382/128 |
| 7,058,221 | B1 * | 6/2006 | Shikata | 382/169 |
| 7,079,671 | B2 * | 7/2006 | Morihara et al. | 382/124 |
| 7,103,234 | B2 * | 9/2006 | Stone et al. | 382/294 |
| 7,123,008 | B1 * | 10/2006 | Damadian et al. | 324/309 |
| 7,310,435 | B2 * | 12/2007 | Mallya et al. | 382/128 |
| 7,593,553 | B2 * | 9/2009 | Fujii | 382/124 |
| 7,620,229 | B2 * | 11/2009 | Oosawa | 382/130 |
| 2002/0055676 | A1 * | 5/2002 | Van Vaals et al. | 600/410 |
| 2003/0032877 | A1 * | 2/2003 | Watts et al. | 600/410 |
| 2003/0053669 | A1 * | 3/2003 | Suri et al. | 382/130 |
| 2003/0083569 | A1 * | 5/2003 | Edelman | 600/410 |
| 2003/0231804 | A1 * | 12/2003 | Bacarella et al. | 382/284 |
| 2003/0233039 | A1 * | 12/2003 | Shao et al. | 600/407 |
| 2004/0008884 | A1 * | 1/2004 | Simske et al. | 382/165 |
| 2004/0012679 | A1 * | 1/2004 | Fan | 348/207.99 |
| 2004/0153128 | A1 * | 8/2004 | Suresh et al. | 607/14 |
| 2006/0165267 | A1 * | 7/2006 | Wyman et al. | 382/128 |
| 2007/0280555 | A1 * | 12/2007 | Chen | 382/294 |

OTHER PUBLICATIONS

Hajnal, Hill, Hawkes, Medical Image Registration, 2001, CRC Press, pp. 144-145.*

Wein W et al:"20/3D registration based on vol. gradients" Proceedings of the SPIE—The International Society for Optical Engineering SPIE—Int. Soc. Opt. Eng USA, vol. 5747, No. 1, 2005, pp. 144-150, XP002381961 ISSN: 0277-786X the whole document.

Penney G P et al: A Comparison of Similarity Measures for Use in 2—D—3—D-Medical Image Registration IEEE Transactions on Medical Imaging, IEEE Service Center, Piscataway, NJ, US, vol. 17, No. 4, Aug. 1998, pp. 586-595, XP002990556 ISSN: 0278-0062 sec. 111-0, "Gradient correlation", p. 589, left—hand col. Y sec. III—A, "Normalized 5,15 cross—correlation", p. 588, right—hand column.

Hajnal, Hill, Hawkes: "Medical Image. Regi stration" 2001, CRC Press, Boca Raton, Florida, US XP002382029 ISBN: 0-8493-0064-9 p. 66, paragraph 2.

Hsu et al: "Automated registration of CT and MR brain images using 3-0 edge detection" Proceedings of the 20TH Annual International Conference of the IEEE Engineering in Medicine and Biology Society. vol. 20 Biomedical Engineering Towards the Year 2000 and Beyond (CAT. No.98CH36286) IEEE Piscataway; NJ, USA, vol. 2, 1998, pp. 679-682 vol. 2, XP010320529 ISBN: 0-7803-5164-9 figure 1.

Zitova B et al: "Image Registration Methods: A Survey" Image and Vision Computing, Guildford, GB, vol. 21, No. 11, Oct. 2003, pp. 977-1000, XP001189327 ISSN: 0262-8856 sec. 3.2, "Feature—based methods" p. 980, left—hand column.

Anuta, P.E., "Spatial registration of multispectral and multitemporal digital imagery using fast fourier transform", *IEEE Transactions on Geoscience Electronics*, (1970),(8):353-368.

Canny, J., "A computational approach to edge detection", *IEEE Transactions on Pattern Analysis and Machine Intelligence*, (Nov. 1986),8(6):679-698.

Carpenter, J.P., et al., "Magnetic resonance ngiography of peripheral runoff vessels", *Journal of Vascular Surgery*, (Dec. 1992),16(6):807-815.

Dyet, J.F., et al., "Vascular imaging and intervention in peripheral arteries in the diabetic patient", *Diabetes/Metabolism Research and Reviews*, (2000),16:S16-S22.

Goyen, Mathias, et al., "Improved multi-station peripheral MR angiography with a dedicated vascular coil",*Journal of Magnetic Resonance Imaging*, (2001),13(3):475-480.

Goyen, M., et al., "Whole-body three-dimensional MR angiography with a rolling table platform: Initial clinical experience", *Radiology*, (2002),224(1):270-277.

Grist, Thomas M., "MRA of the abdominal aorta and lower extremities", *Journal of Magnetic Resonance Imaging*, (Jan. 2000),11(1):32-43.

Harms, S.E., et al., "Magnetic resonance angiography, application to the peripheral circulation", *Investigative Radiology*, (Dec. 1992),(27):S80-S83.

Koelemay, M. J., et al., "Magnetic resonance angiography for the evaluation of lower extremity arterial diseases: A meta-analysis", *The Journal of the Americal Medical Association*, (2001),(285):1338-1345.

Prince, M.R., "Gadolinium-enhanced MR aortography", *Radiology*, (1994),(191):166-164.

Runge, V.M., et al., "Contrast-enhanced MR angiography", *Journal of Magnetic Resonance Imaging*, (1993),(3):233-239.

Schild, H.H., et al., "Contrast-enhanced magnetic resonance angiography, potential applications and pitfalls in magnetic resonance angiography-guided therapy: a review", *Investigative Radiology*, (1998),9(9):524-527.

Shetty, Anil N., et al., "Body vascular MR angiography: Using 2d- and 3d-time-of-flight techniques", *Concepts in Magnetic Resonance*, (2000),12(4):230-255.

Swan, J.S., et al., "Time resolved three-dimensional contrast-enhanced MR angiography of the peripheral vessels", *Radiology*, (2002),(225):43-52.

Van Wie, P., et al., "A landsat digital image rectification system", *IEEE Transactions on Geoscience Electronics*, (1977),(15):130-136.

Velazquez, O.C., et al., "Magnetic resonance angiography of lower-extremity arterial disease", *Surgery Clinics of North America*, (Aug. 1998),4(78):519-537.

Zitova, Barbara, et al., "Image registration methods: a survey", *Image and Vision Computing*, (Oct. 2003),21(11):977-1000.

* cited by examiner

FEATURE-BASED COMPOSING FOR 3D MR ANGIOGRAPHY IMAGES

CROSS-REFERENCE TO RELATED APPLICATIONS

This application claims the benefit of U.S. Provisional Application No. 60/604,133, filed Aug. 24, 2004, which is incorporated herein by reference.

BACKGROUND OF THE INVENTION

The present invention relates to system and methods for composing images for magnetic resonance angiography.

Magnetic Resonance (MR) Angiography (MRA) is a technique to image vasculature in a human body. During data acquisition, a set of volumes covering the whole body or peripheral vessels is obtained. One issue that needs to be addressed is the problem of aligning (registering) these volumes to produce a single compact image.

MRA has developed as a way of generating a predictable image contrast due to the nature of a blood flow. A contrast agent is usually applied prior to the imaging to enhance the visibility of vascular structures. MRA enables a physician to perform a complete range of body vasculature examinations. See, for example, V. M. Runge, J. Kirsch, and C. Lee, Contrast-enhanced MR angiography, *Journal of Magnetic Resonance Imaging*, (3):233-239, 1993; H. H. Schild and C. K. Kuhl, Contrast-enhanced magnetic resonance angiography, potential applications and pitfalls in magnetic resonance angiography-guided therapy: a review, *Investigative Radiology*, 9(9):524-527, 1998 and Anil N. Shetty, Kostaki G. Bis, and Ali Shirkhoda, Body vascular MR angiography: Using 2d- and 3d-time-of-flight techniques, *Concepts in Magnetic Resonance*, 12(4):230-255, 2000. This includes the diagnosis of circulatory diseases in diabetics and other patients. See, for example, J. F. Dyet, A. A. Nicholson, and D. F. E. Ettles, Vascular imaging and intervention in peripheral arteries in the diabetic patient, *Diabetes/Metabolism Research and Reviews*, 16:S16-S22, 2001.

Peripheral angiography is performed to visualize the arteries away from the center of the body. See, for example, S. E. Harms and D. P. Flamig, Magnetic resonance angiography, application to the peripheral circulation, *Investigative Radiology*, (27):S80-S83, December 1992 and J. S. Swan, T. J. Carroll, T. W. Kennell, D. M. Heisey, F. R. Korosec, R. Frayne, C. A. Mistretta, and T. M. Grist, Time resolved three-dimensional contrast-enhanced MR angiography of the peripheral vessels, *Radiology*, (225):43-52, 2002. One of the most common applications is to examine arteries that supply blood flow to the legs. See, for example, J. P. Carpenter, R. S. Owen, R. A. Baum, C. Cope, H. D. Berkowitz C. F. Barker, M. A. Golden, and L. J. Perloff, Magnetic resonance angiography of peripheral runoff vessels, *Journal of Vascular Surgery*, 16(6):807-815, December 1992; M. Goyen, H. H. Guick, J. F. Debatin, M. E. Ladd, J. Barkhausen, C. U. Herborn, S. Bosk, H. Kuehl, M. Schleputz, and S. G. Ruehm, Whole-body three-dimensional MR angiography with a rolling table platform: Initial clinical experience, *Radiology*, 224(1):270-277, 2002; Thomas M. Grist, MRA of the abdominal aorta and lower extremities, *Journal of Magnetic Resonance Imaging*, 11(1):32-43, January 2000; M. J. Koelemay, J. G. Lijmer, J. Stoker, D. A. Legemate, and P. M. Bossuyt, Magnetic resonance angiography for the evaluation of lower extremity arterial diseases: A meta-analysis, *The Journal of the American Medical Association*, (285):1338-1345, 2001 and O. C. Velazquez, R. A. Baum, and J. P. Carpenter, Magnetic resonance angiography of lower-extremity arterial disease, *Surgery Clinics of North America*, 4(78):519-537, August 1998. Examinations are also made of the abdominal region as well as the upper body. See, M. R. Prince, Gadolinium-enhanced MR aortography, *Radiology*, (191):166-164, 1994.

Physicians can now obtain angiograms covering the whole body for the complete vascular system examination. Due to the technical limitations of the MR systems, however, it is not possible to obtain the full body scan at once. It is only recently that the technology is approaching this goal with scanners that allow large field of view and volumes to be obtained in a single pass. However, there exists a great amount of data from previous procedures, when patients often had to be repositioned in between acquisitions. During the whole body imaging, a series of volumes is acquired and to enable diagnostic excellence in their interpretations, it is desired to visualize them jointly in one composed volume.

There is a considerable amount of work on the medical image registration topic dealing with different volume scales, rotations, affine (or higher order) transformations, deformations, multi modality and other complications. However, systems and methods for accomplishing the process of viewing a series of volumes in one composed volume automatically, without human intervention, are needed.

SUMMARY OF THE INVENTION

In accordance with one aspect of the present invention, a method of aligning a plurality of volumes from a single patient is provided. In a first step, data from each of the plurality of volumes are equalized according to a maximum resolution of the plurality of volumes. Thus, the pixel sizes in the images are equalized. Then, the edges in each of the plurality of volumes are detected to determine feature volumes in each of the plurality of volumes. Two edge maps, corresponding to the two volumes being aligned, are formed. In the next step, the correlation of the first edge map to the second edge map at a plurality of overlapping positions is determined. The optimal alignment of the two volumes is determined by maximizing the correlation value. Thus, the overlapping position having the maximum correlation is deemed by optimal alignment.

In accordance with another aspect of the present invention, each of the plurality of volumes is sheared based on the tilt angle to correct distortion caused by different tilt angles of the composing volumes.

In accordance with a further aspect of the present invention, a search range that specifies the range of possible values of alignment parameters is determined and the step of detecting edges in each of the plurality of volumes to determine feature volumes in each of the plurality of volumes is only performed in the search range.

In a preferred embodiment of the present invention, every other voxel from each of the plurality of volumes is discarded before performing any steps. This results in a coarse determination of correlation and alignment. Then, once a coarse alignment has been determined, the processing is done in full resolution to determine a fine correlation and a fine alignment.

The present invention also provides a system for aligning a plurality of volumes from a single patient that implements these steps. The system includes means for equalizing data from each of the plurality of volumes to a maximum resolution of the plurality of volumes, means for detecting edges in each of the plurality of volumes to determine feature volumes in each of the plurality of volumes, and means for performing the above described correlations.

In accordance with one aspect of the present invention, the problem addressed falls into the category of rigid registration algorithms. One of the objects of the present invention is to spatially align a fixed image $I_f$ with a moving image $I_t$ by determining the optimal set of translation parameters $(\hat{t}_x, \hat{t}_y, \hat{t}_z)$ along x, y, z (horizontal, vertical, depth) axes respectively. In accordance with another aspect of the present invention, this is accomplished by computing the normalized cross correlation on the feature volume pairs, where features are detected as edges in 2D slices of the original volumes. An exhaustive search is conducted to find the global maximum of the correlation score. Computation is preferably done in a multi-scale, multi-resolution manner, as previously described, to compensate for the high cost of the correlation and optimum search.

It is an object of the present invention to align multiple MRA volumes. In a preferred embodiment of the present invention, the multiple volumes do not exhibit any geometric distortion.

DESCRIPTION OF A PREFERRED EMBODIMENT

Medical imaging devices, such as a magnetic resonance imaging machine, produce volumes. In today's imaging procedures a plurality of volumes of a body are taken, creating a plurality of volumes of data.

In accordance with one aspect of the present invention, a plurality of volume are processed and then aligned to form one volume. The volumes are preferably derived from Magnetic Resonance Angiography procedures, but can be derived from other medical imaging techniques. In accordance with one aspect of the present invention, the technique first detects edges in volumes and then aligns them using normalized cross correlation. Speedup is preferably achieved by multi-resolution processing. Results show alignment errors that are within the tolerance of a human observer judgment of what the actual best manual alignment is, on average 1.28, 3.60, 2.05 voxels in horizontal, vertical and depth directions respectively.

Figure 1:
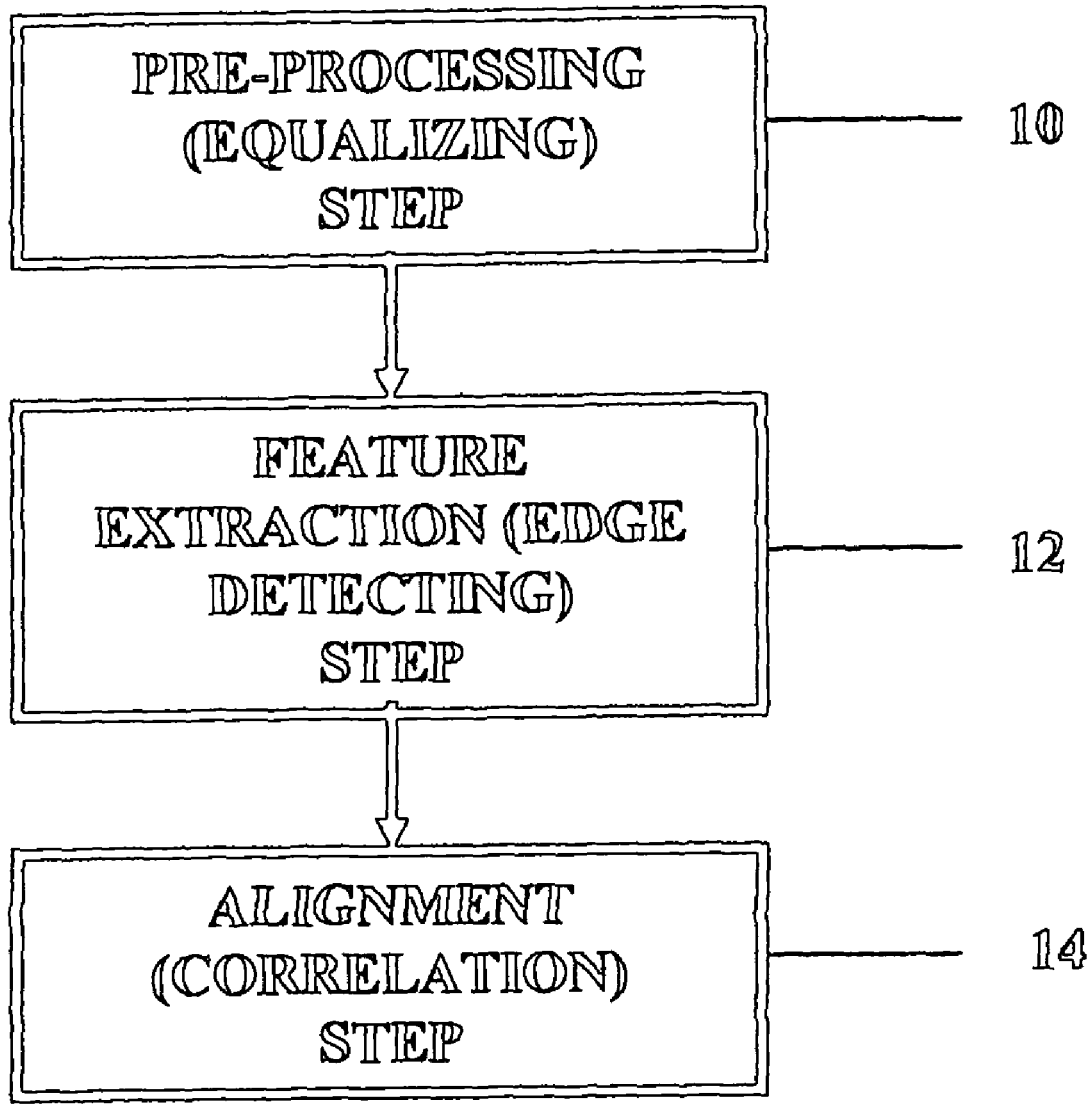
FIG. 1 illustrates the steps in a process in accordance with one aspect of the present invention.

Referring to FIG. 1, the steps to align a plurality of volumes in accordance with one aspect of the present invention are illustrated. In step 10, initial preprocessing steps are performed. These steps include volume shearing and equalization. In step 12, edge detection to extract features is performed. In step 14, an optimal search for alignment, preferably using normalized cross correlation measures, is performed. This specification also discusses speed and memory issues with the process and further discusses results obtained using the process. Thus, the process of the present invention preprocesses the volumes, detects edges and aligns them using normalized cross correlation. Each of these steps is discussed in greater detail in the following sections. The volumes in DICOM format—a standard, well known medical image file format—corresponding to a single patient from one acquisition set are read and equalized to the highest resolution out of all in the given volumes. This creates a plurality of volumes with the same resolution.

The required output of the process of the present invention is a single composite volume along with the alignment parameters. Thus, this equalization would be necessary regardless of the feature extraction or optimization algorithm used. The information stored in the DICOM header is collected and utilized throughout the execution. Depending on the imaging protocol, volumes can exhibit various amounts of distortion (caused by MR image reconstruction) and even though most of these are corrected during the acquisition process, we usually need to correct for shearing based on the tilt angle, a value contained in the DICOM header. Other parameters, such as relative table position and image position allow the computation of suggested parameters, which are alignments (shifts in horizontal, vertical and depth directions) used for computing the search range, a range of possible values of alignment parameters from which the best set of values is chosen.

In the equalization process, as previously mentioned, the highest resolution of the volumes being processed is selected and all voxels in the volumes being processed are normalized to the minimum voxel size. By equalizing the data, the data can be properly correlating in a later step.

Once these preprocessing steps have been completed, in step 12, edge detection is performed. The injection of the contrast medium and the use of enhancement coils will produce images that have often very different intensity distribution even at the corresponding locations that are to be aligned together. See, for example, Mathias Goyen, Stefan G. Ruehm, Jrg Barkhausen, Knut Krger, Mark E. Ladd, Karl-Heinz Truemmler, Silke Bosk, Martin Requardt, Arne Reykowski, and Jrg F. Debatin. Improved multi-station peripheral MR angiography with a dedicated vascular coil. *Journal of Magnetic Resonance Imaging*, 13(3):475-480, 2001 and M. R. Prince. Gadolinium-enhanced MR aortography. *Radiology*, (191):166-164, 1994, both of which are hereby incorporated by reference.

It is preferably to detect reliable features that will be invariant to intensity changes, insensitive to noise, repeatable and relatively fast to compute. A standard Canny edge detector can perform the task quite well and is preferably used to detect edges in 2D (horizontal-vertical) slices of the input volumes. See, for example, J. Canny, A computational approach to edge detection. *IEEE Transactions on Pattern Analysis and Machine Intelligence*, 8(6):679-698, November 1986, which is incorporated by reference.

Strong edges are most often detected at the boundary of vessels and other anatomical structures such as organs and bones. More importantly, the strongest edges are found around vessels that appear very bright on a dark background due to the contrast enhancement. Nonmaxima suppression will provide a pixel wide lines and hysteresis thresholding removes weak edges. The edge map is not binarized.

To save computation, the features are computed only for the search range, i.e. those parts of the volumes that will be used to find the alignment values. Distortion corrections or shearing will cause the originally block shaped (foreground) data to be contained in a block and surrounded by a dark background (usually having zero intensity value). This has the undesired effect of the presence of edges around the original data volume. They are removed by a mask found from non-background voxels and eroded by 1 voxel in all directions.

Next, normalized cross correlation is performed in step 14.

At this step, the feature volumes have been obtained and the best alignment of the feature volumes must be determined. In accordance with one aspect of the present invention, this is performed by maximizing an objective function. This function compares the two feature volumes (edge maps) and determine what translation between them optimizes its value.

Figure 2:
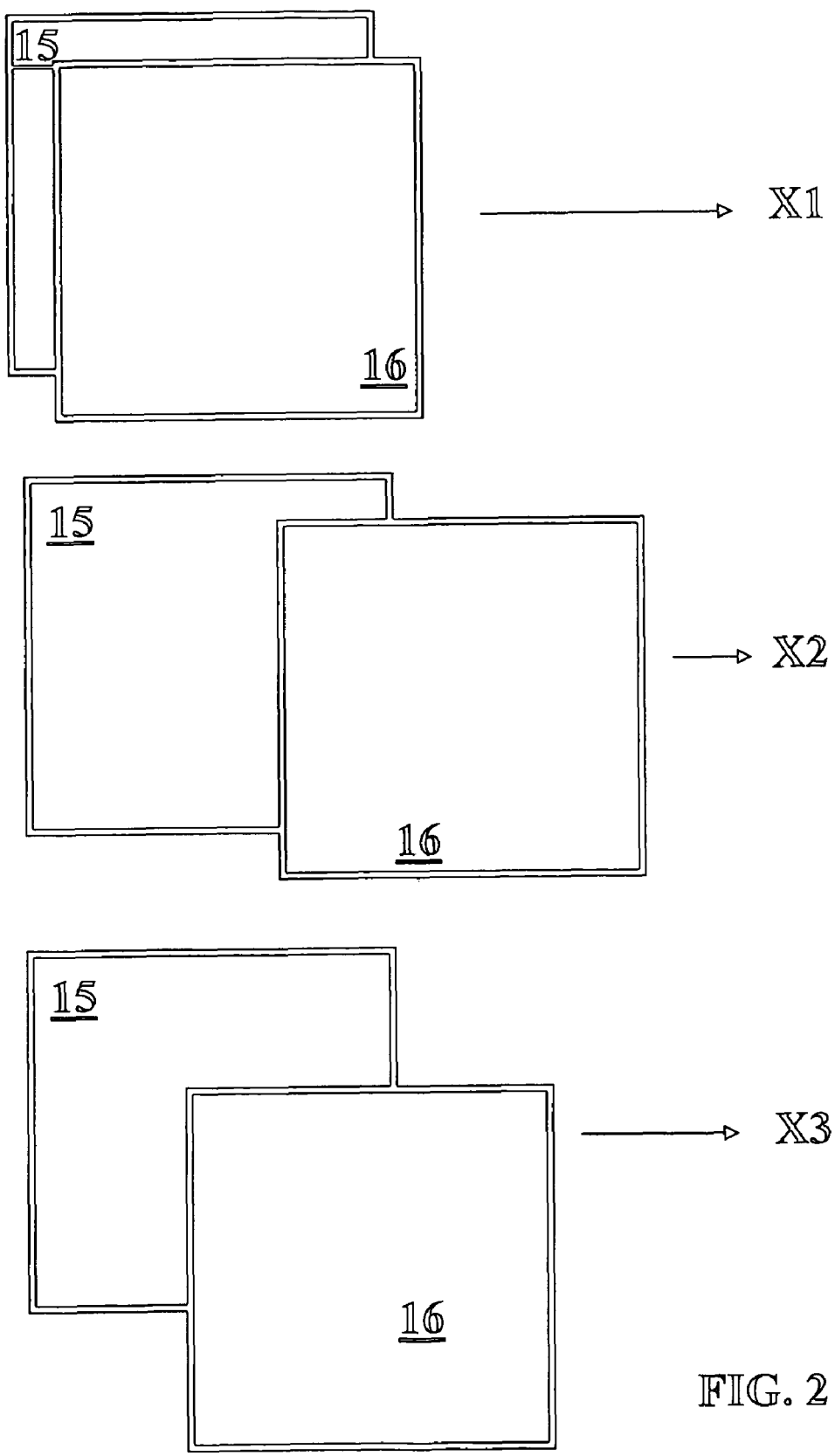
FIG. 2 illustrates a correlation step in accordance with one aspect of the present invention.

FIG. 2 illustrates the correlation process in accordance with one aspect of the present invention in greater detail. Two edge maps 15 and 16 are illustrated in a first overlapping position. A correlation value, X1, is determined for the first position. The two edge maps 15 and 16 are then moved into a plurality of overlapping positions, and the correlation for each position is determined. For example, in the middle illustration, the two edge maps 15 and 16 are in a new overlapping position, and a correlation value, X2, is determined. Similarly, in the bottom illustration, the two edge maps 15 and 16 are in a third overlapping position, and a correlation value, X3, is determined. The best alignment of the edge maps 15 and 16 is determined by the maximum correlation value. Thus, if X2 is the maximum correlation, then the middle overlapping position of the edge maps is deemed the optimal alignment.

It is preferred to use a normalized cross correlation with a few modifications that will correct some of the drawbacks of this measure. The preferred correlation equation is expressed as follows.

$$f(t) = \frac{\sum_{p \in O}[I_f(p) - \bar{I}_f][I_t(p+t) - \bar{I}_t]}{\left\{\sum_{p \in O}[I_f(p) - \bar{I}_f]^2 \sum_{p \in O}[I_t(p+t) - \bar{I}_t]^2\right\}^{\frac{1}{2}}}, \quad (1)$$

where $$\bar{I}_f = \frac{1}{n}\sum_{p \in O} I_f(p), \quad (2)$$

and $$\bar{I}_t = \frac{1}{n}\sum_{p \in O} I_t(p), \quad (3)$$

where $I_f$ is the fixed image (such as the first edge map 15), $I_t$ is the moving image (such as the second edge map 16), $p=(p_x, p_y, p_z)$ is the location of the fixed image, $t=(t_x, t_y, t_z)$ is the current translation of the moving image with respect to the fixed image, n is the number of points being considered in the overlap region O and $\bar{I}_f$, $\bar{I}_t$ are algebraic means of the pixel values from the fixed and moving volume respectively, computed in the overlap region O.

The cross correlation is known to favor alignments with large overlap of areas of homogeneous intensity. These will also cause a flatness of the similarity measure maxima. In our case we have edges in the foreground and often very large regions with dark background. To make the correlation reflect the goodness of the alignment better, it is preferred not to cross correlate voxels, if both of the voxels come from the background. This avoids favoring alignments for which most of the background overlaps. If edges in one image fall on the background in the other image, however, they get penalized as misaligned. The cross correlation is computed only in the overlap region, so if any part of the first volume falls outside of the second one (considering only region that has not been masked out during preprocessing), this part is skipped during alignment computation. Strength of each voxel, that gets correlated, is equal to the strength of the edge. This is why we did not binarize the image during feature computation.

The exhaustive search is performed to maximize the objective function in Equation 1. We have investigated faster ways of arriving at the maximum value, such as gradient-based methods, for example, but these could easily be trapped in the local minima due to the complexity of the alignment data. Quality of the alignment is reflected in the correlation score and is mapped to values between 0 and 100 with a piece-wise linear function.

To compensate for the high cost of the exhaustive search and cross correlation, the images are processed in a multi-scale manner in accordance with another aspect of the present invention. In accordance with this aspect of the present invention, the resolution of the first volume of data and the resolution of the second volume of data is reduced. This can be accomplished, by way of example, by selecting alternate voxel values in each volume of data.

The processing of the data then proceeds as illustrated in FIG. 1. Thus, a coarse correlation value is determined based on a lower resolution of the available data. Because a lower amount of data is processed in the coarse correlation determination, the processing speed is fast.

The coarse alignment is then used to limit the area that is processed in the next step. The range of overlapping positions in which a correlation is calculated is limited. The correlation of the two feature volumes (edge maps) in the limited number of overlapping positions is determined, and the optimal alignment is determined by a maximum value of the correlations.

Figure 3:
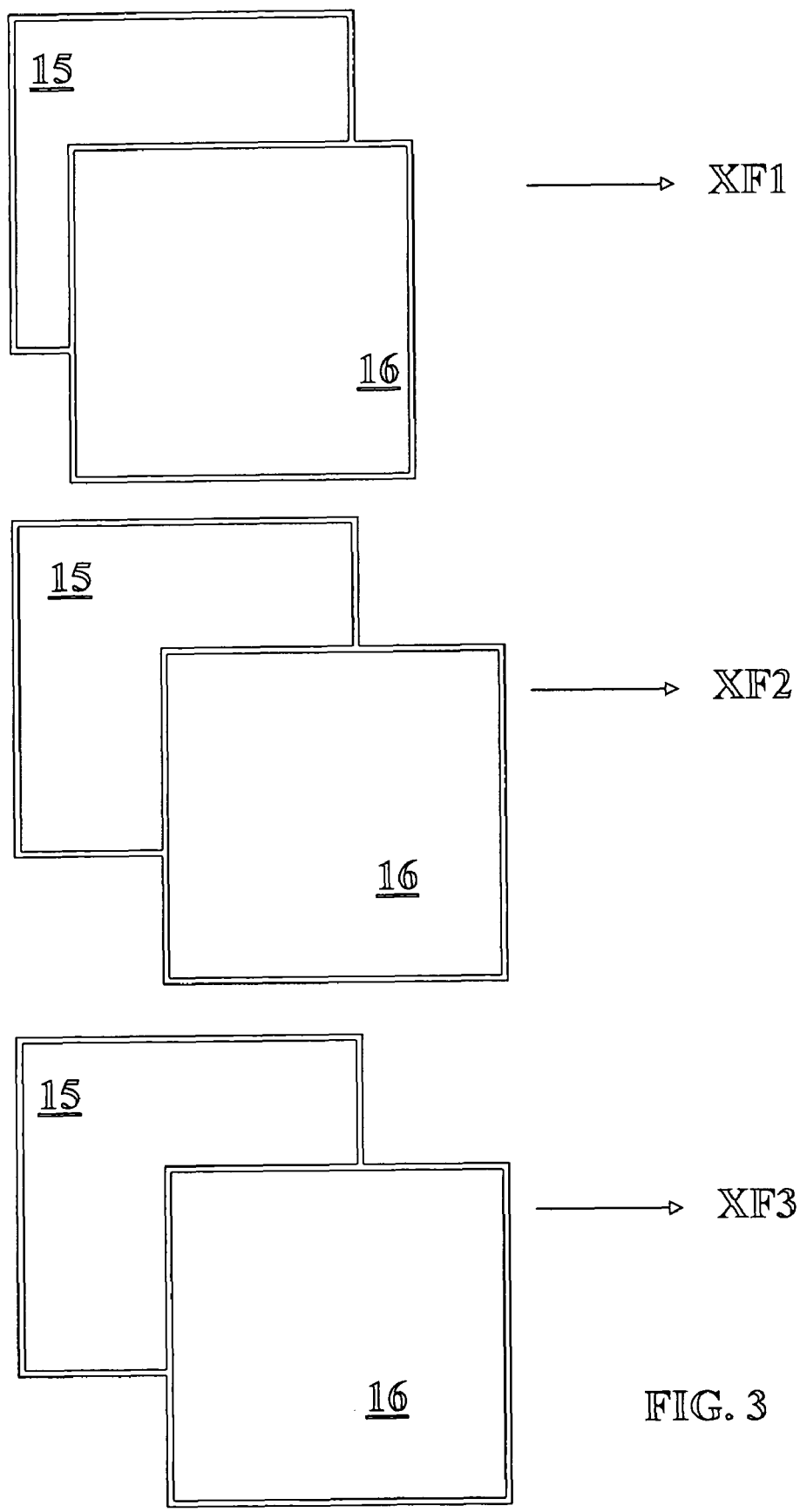
FIG. 3 illustrates another correlation step in accordance with another aspect of the present invention.

This is illustrated in FIG. 3. The edge maps 15 and 16 in FIG. 3 are determined by down-sampling the edge maps with the original resolutions. The range of overlapping positions in FIG. 3 is determined by the coarse correlation from the prior step. The determination of the correlations illustrated in FIG. 3 is therefore based on a full resolution of the images, and can be thought of as a fine correlation determination. The optimal alignment is determined by maximizing the fine correlation values.

This improves computation speed and conserves on memory usage. In accordance with a preferred embodiment, the original feature volume is down-sampled one level discarding every other voxel. Faster computation was the main reason for this simple downscaling algorithm, although a more complicated interpolation process could also be used. Best alignment parameters are found in the downscaled search range and the finer level refines the translation parameters around the (upscaled) optimal solution from the coarse level. Using more levels did not prove beneficial because of the additional cost of down-sampling operation and because volumes lose too much significant information.

In accordance with a preferred embodiment, multiple volumes are processed sequentially, by pairs. This processing continues until all volumes have been processed and aligned. It is further preferred that when the alignment parameters for the particular pair are known, all partial results and temporary variables (including feature volumes) are freed from the memory. At the end of the composing process, only the original volumes and composed result (with blended overlap regions) are kept in memory. The memory usage throughout the program execution will not exceed this amount.

Figure 4:
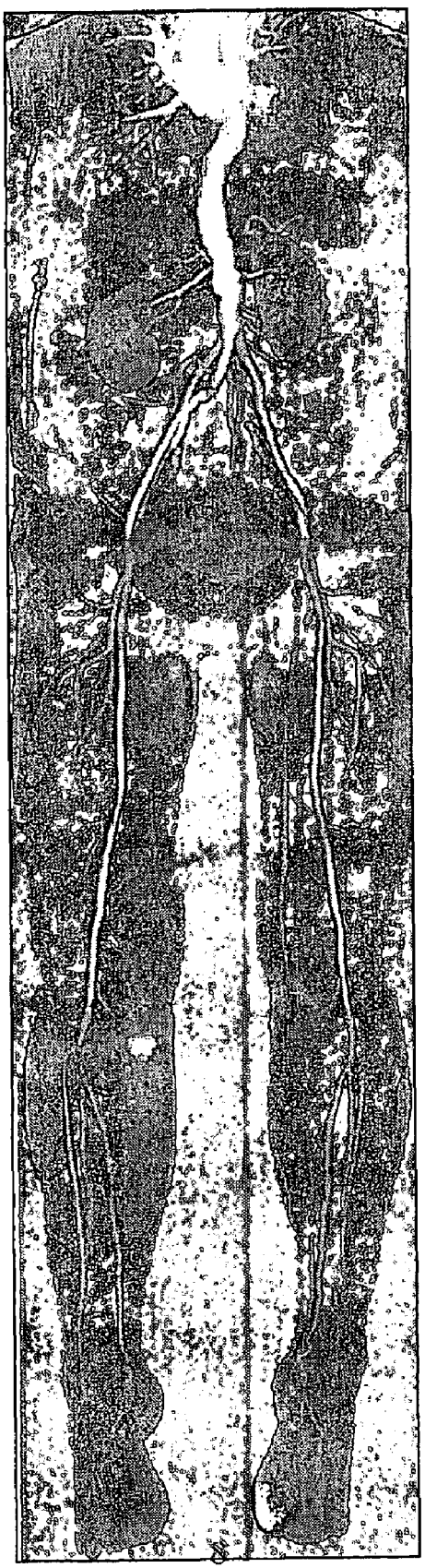
FIG. 4 illustrates a single image obtained from the present invention.

FIG. 4 illustrates results obtained from the present invention. One volume (the one with highest resolution) in the composed set in FIG. 4 is 352×512×96 and the maximum possible overlap region (across the search range shifts) is 351×67×73 voxels. It took 13 seconds to compose the data set of three volumes illustrated in FIG. 2.

The algorithm was tested on a collection of 12 patient series, a total of 31 volume pairs, and compared to the manual alignments collected by two observers. The table presented below summarizes the results. The first two rows of the table show average distances (error in alignment) in each direction and combined Euclidean distance and the third row shows an intra observer error, ie. distance (average error) between the two observers. The average distances are in voxels in horizontal (H), vertical (V), depth (D) directions and average Euclidean distance of 31 automatic (A) volume alignments from two manual alignments ($O_1$, $O_2$). The third row shows average error with respect to the two observers. Last row gives average distances between the two observers. The error is larger in the vertical direction. This is because the vessels (structures with the highest contrast) run from the image top to the image bottom, so their manual localization in horizontal direction is much more precise than the localization in vertical direction, where there is often not enough landmarks to help. Larger error in the depth direction is caused by the lower depth resolution and the physical structure of the volume (human anatomy). For example, when using MIP image (along horizontal direction) of the leg volumes to find the depth shift, the intensities of the two legs get mixed together and the MIP image is often very cluttered. Moreover, the resolution in the depth direction is low and thus it is hard to align the depth manually because it is usually very complicated to decide, what the best alignment is.

| Distance | H | V | D | Euclidean |
|---|---|---|---|---|
| A vs. $O_1$ | 1.26 | 4.00 | 2.23 | 5.42 |
| A vs. $O_2$ | 1.29 | 3.19 | 1.87 | 4.48 |
| A vs. $O_1$, $O_2$ | 1.28 | 3.60 | 2.05 | 4.95 |
| $O_1$ vs. $O_2$ | 1.00 | 3.45 | 2.35 | 5.63 |

In summary, using edges detected in 2D slices as features have properties that make the composing very successful. The three desired properties are:
  localization: outline the anatomical structure exactly making the localization precise and accurate
  efficiency: fast to compute
  robustness: invariant to intensity inhomogeneity caused by surface coils, reliable and repeatable features Using edges in 3D defined as local extrema of the gradient magnitudes were also considered, but the alignments were not better and the speed decreased due to the additional derivative computation (in depth direction). The average alignment errors are within tolerance region in which the decision about the best alignment is often ambiguous.

Figure 5:
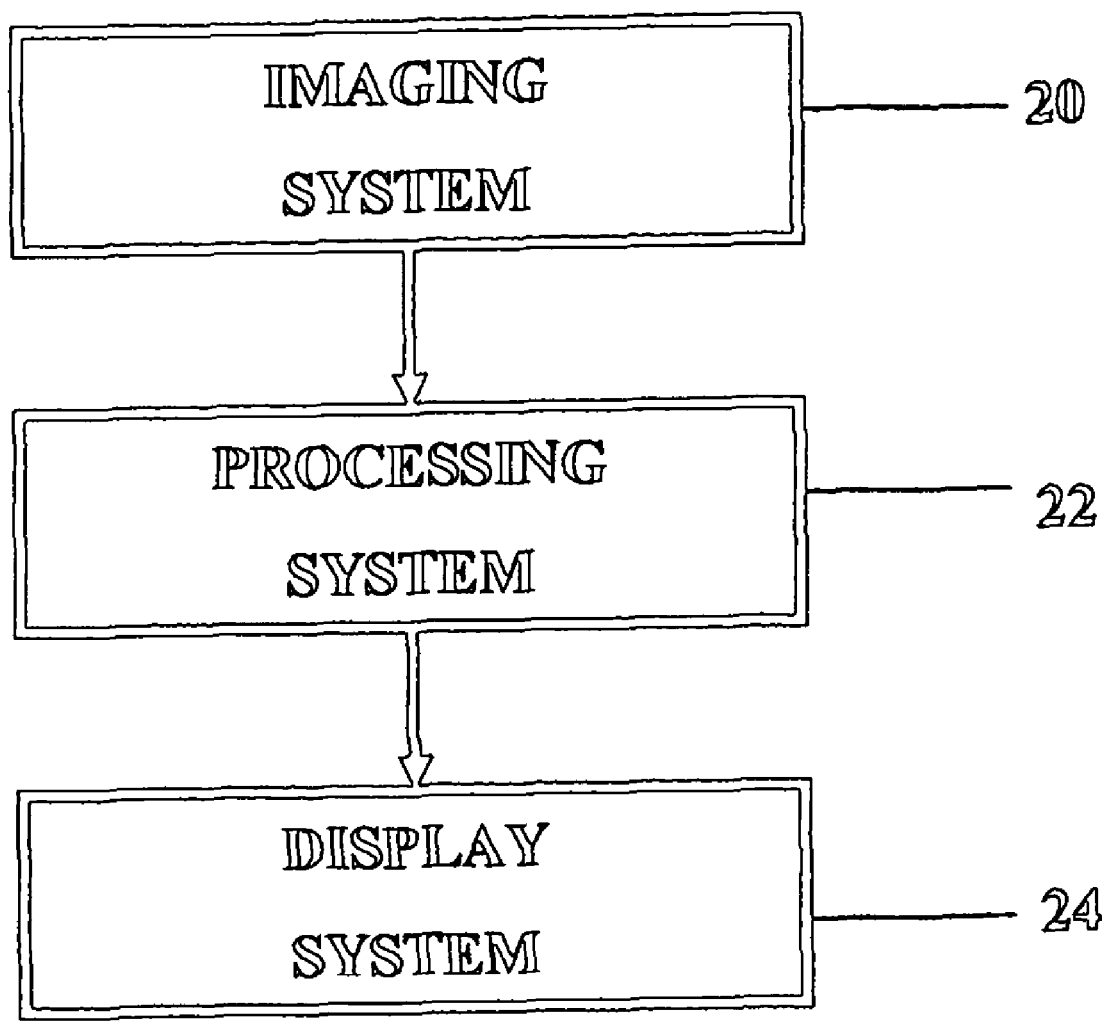
FIG. 5 illustrates a system in accordance with one aspect of the present invention.

Referring to FIG. 5, a system in accordance with one aspect of the present invention is illustrated. An imaging system 20 generates data that results in a plurality of volumes of image data. The imaging system 20 is typically a magnetic resonance machine, but may include other types of imaging devices. A processing system 22 receives the plurality of volume of images in accordance with the method of the present invention as previously discussed. The processing system 22 performs each of the previously discussed steps, including without limitation, the steps of equalizing, edge detecting and comparing and aligning. The processing system is preferably a personal computer or a more powerful computing device, such as a workstation or a multi-processor computing station. The display system 24 can display the individual volumes of images or can also display the aligned single volume of images derived by the steps of the present invention, either in whole or in part.

Although the invention herein has been described with reference to particular embodiments, it is to be understood that these embodiments are merely illustrative of the principles and applications of the present invention. It will be apparent to those skilled in the art that various modifications and variations can be made to the method of the present invention without departing from the spirit and scope of the invention. Thus, it is intended that the present invention include modifications and variations that are within the scope of the appended claims and their equivalents.

The invention claimed is:

1. A method of aligning by a processor of a plurality of volumes from a patient, comprising:
  reading by the processor of the plurality of volumes being Magnetic Resonance Angiography (MRA) volumes in DICOM format and correcting at least one of the plurality of volumes for shearing based on a tilt angle obtained from a DICOM header;
  equalizing the plurality of volumes with the highest resolution of the plurality of volumes;
  detecting edges in a plurality of 2D slices of a first volume of the plurality of volumes within a search range and a plurality of 2D slices of a second volume of the plurality of volumes within the search range to form a first and a second plurality of edge maps, respectively, the first and second edge maps having an overlap region wherein the overlap region depends upon the search range;
  designating the first plurality of edge maps as a fixed image $I_f$ with a location $p=(p_x, p_y, p_z)$;
  designating the second plurality of edge maps as a moving image $I_t$ with a translation $t=(t_x, t_y, t_z)$ with respect to the fixed image;
  determining the search range based on a shift in a horizontal, vertical and depth direction of a parameter, the parameter determined from at least a relative table position and an image position; and
  determining a correlation of the first plurality of edge maps to the second plurality of edge maps at a plurality of overlapping positions in the overlap region O containing the location p for all 2D slices in the overlap region of the first and the second volume to determine a best alignment of the first volume and the second volume.

2. The method as claimed in claim 1, further comprising:
  detecting edges in the remaining plurality of volumes to form additional edge maps; and
  determining the correlation of adjacent edge maps to determine the best alignment of the remaining plurality of volumes.

3. The method as claimed in claim 1, further comprising aligning the first volume and the second volume based on the correlation step to form a single image.

4. The method as claimed in claim 1, wherein the best alignment between the first volume and the second volume is found when the correlation of the plurality of overlapping positions is maximized.

5. The method as claimed in claim 1, wherein the correlating step is determined by maximizing the output of the formula:

$$f(t) = \frac{\sum_{p \in O} [I_f(p) - \bar{I}_f][I_t(p+t) - \bar{I}_t]}{\left\{ \sum_{p \in O} [I_f(p) - \bar{I}_f]^2 \sum_{p \in O} [I_t(p+t) - \bar{I}_t]^2 \right\}^{\frac{1}{2}}},$$

where $$\bar{I}_f = \frac{1}{n}\sum_{p \in O} I_f(p),$$

and $$\bar{I}_t = \frac{1}{n}\sum_{p \in O} I_t(p).$$

6. The method as claimed in claim 1, wherein the step of equalizing equalizes the size of voxels in all the volumes.

7. The method as claimed in claim 1, wherein the step of detecting edges uses a Canny edge detector.

8. The method as claimed in claim 1, further comprising:
   forming the first and second edge maps by down-sampling edge maps derived from volumes having full resolution, whereby the first and second edge maps represent a coarse resolution;
   selecting an optimized alignment on the coarse resolution edge maps by maximizing coarse correlation values; and
   determining an optimized alignment on the original resolution edge maps by maximizing fine correlation values around the optimized alignment on the coarse resolution.

9. The method as claimed in claim 1, wherein one or more voxels of a background in the first plurality of edge maps overlapping with one or more voxels of a background in the second plurality of edge maps do not contribute to the correlation.

10. A system for aligning a plurality of volumes from a patient, comprising:
    means for reading the plurality of volumes being Magnetic Resonance Angiography (MRA) volumes in DICOM format and correcting at least one of the plurality of volumes for shearing based on a tilt angle obtained from a DICOM header;
    means for equalizing the plurality of volumes with the highest resolution of the plurality of volumes;
    means for detecting edges in a plurality of 2D slices of a first volume of the plurality of volumes within a search range and in a plurality of 2D slices of a second volume of the plurality of volumes within a search range to form a first and a second plurality of edge maps, respectively, the first and second edge maps having an overlap region, wherein the-overlap region of the first and the second volume depends upon the search range;
    means for determining the search range based on a shift in a horizontal, vertical and depth direction of a parameter, the parameter determined from at least a relative table position and an image position; and
    means for determining a correlation of the first plurality of edge maps to the second plurality of edge maps for all 2D slices in the overlap region of the first and the second volume to determine a best alignment of the first volume and the second volume.

11. The system as claimed in claim 10, further comprising:
    means for detecting edges in the remaining plurality of volumes to form additional edge maps; and
    means for determining the correlation of adjacent edge maps to determine the best alignment of the remaining plurality of volumes.

12. The system as claimed in claim 10, further comprising means for aligning the remaining volumes based on the correlation step to form a single image.

13. The system as claimed in claim 10, wherein the best alignment between the first volume and the second volume is found when the correlation of the plurality of overlapping positions is maximized.

14. The system as claimed in claim 10, wherein the means for determining the correlation maximizes the output of the formula:

$$f(t) = \frac{\sum_{p \in O} [I_f(p) - \bar{I}_f][I_t(p+t) - \bar{I}_t]}{\left\{\sum_{p \in O} [I_f(p) - \bar{I}_f]^2 \sum_{p \in O} [I_t(p+t) - \bar{I}_t]^2\right\}^{\frac{1}{2}}},$$

where $$\bar{I}_f = \frac{1}{n}\sum_{p \in O} I_f(p),$$

and $$\bar{I}_t = \frac{1}{n}\sum_{p \in O} I_t(p).$$

15. The system as claimed in claim 10, wherein the means for equalizing equalizes the size of voxels in all the volumes.

16. The system as claimed in claim 10, wherein the means for detecting edges uses a Canny edge detector.

17. The system as claimed in claim 10, further comprising:
    means for forming the first and second edge maps by down-sampling edge maps derived from volumes having full resolution, whereby the first and second edge maps represent a coarse resolution;
    means for selecting an optimized alignment on the coarse resolution edge maps by maximizing coarse correlation values; and
    means for determining an optimized alignment on the original resolution edge maps by maximizing fine correlation values.

18. The system as claimed in claim 10, wherein one or more voxels of a background in the first plurality of edge maps overlapping with one or more voxels of a background in the second plurality of edge maps do not contribute to the correlation.

19. A system for aligning a first volume of image data and a second volume of image data from a single patient, comprising:
    a device for imaging a body part to form the first volume and the second volume;
    a processor that reads the plurality of volumes being Magnetic Resonance Angiography (MRA) volumes in DICOM format and corrects at least one of the plurality of volumes for shearing based on a tilt angle obtained from a DICOM header, that equalizes data from the first volume and data from the second volume, that detects edges within a search range in the first volume to form a first plurality of edge maps of a plurality of 2D slices of the first volume, that detects edges within a search range in the second volume to form a second plurality of edge maps of a plurality of 2D slices of the second volume, the first and second edge maps having an overlap region, the overlap region being determined by a search range, based on shifts in a horizontal, vertical and depth direction of a parameter, the parameter determined from at least a relative table position and an image position, that performs determining a correlation between the first plurality of edge maps and the second plurality of edge maps at a plurality of overlapping positions in the search range between the first plurality of edge maps and the second plurality of edge maps, and that determines the best alignment of the first volume and the second volume based on the correlation; and means for displaying a single image derived from the first and second volumes.

20. The system as claimed in claim 19, wherein a plurality of volumes from a single patient is processed and the best alignment of the plurality of volumes is determined.

* * * * *